(No Model.)
E. HOTCHKISS.
WAFFLE IRON.
No. 401,560. Patented Apr. 16, 1889.
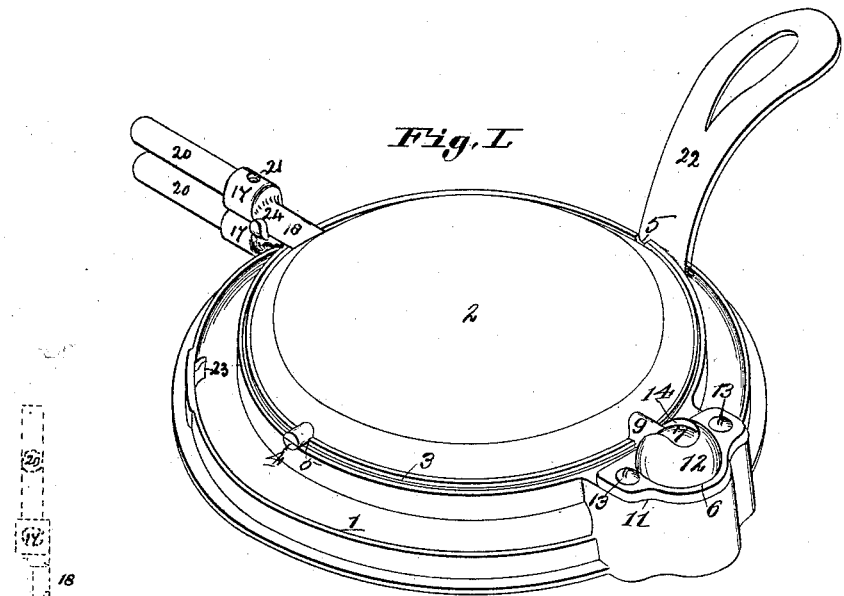
Fig. I.
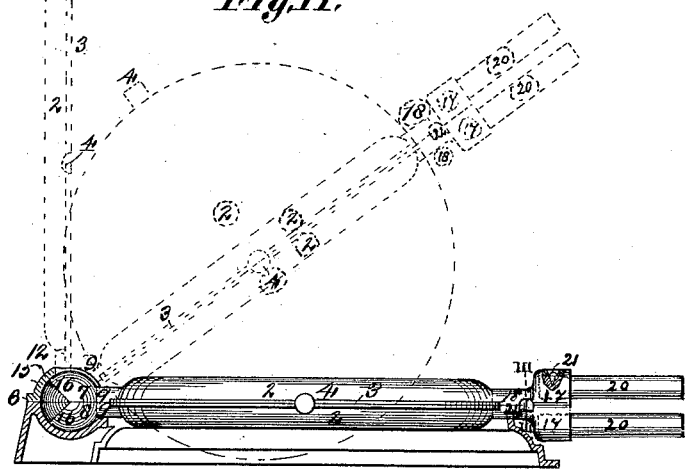
Fig. II.
Fig. III.
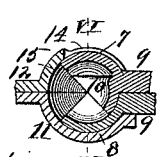
Fig. IV.
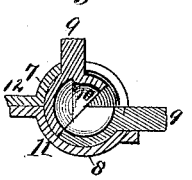
Fig. V.
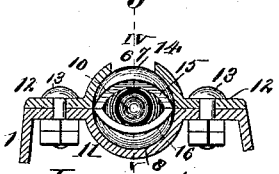
Fig. VI.
Attest:
Emma Arthur
W. E. Knight
Inventor:
Edward Hotchkiss.
By Knight Bros.
attys.

UNITED STATES PATENT OFFICE.

EDWARD HOTCHKISS, OF ST. LOUIS, MISSOURI, ASSIGNOR TO WILLIAM STROMBERG, OF SAME PLACE.

WAFFLE-IRON.

SPECIFICATION forming part of Letters Patent No. 401,560, dated April 16, 1889.

Application filed December 22, 1888. Serial No. 294,390. (No model.)

*To all whom it may concern:*

Be it known that I, EDWARD HOTCHKISS, of the city of St. Louis, in the State of Missouri, have invented a certain new and useful Improvement in Waffle-Irons, of which the following is a full, clear, and exact description, reference being had to the accompanying drawings, forming part of this specification.

This invention relates, principally, to a sectional universal ball-and-socket-turning joint for a waffle-iron, by which it can be expeditiously reversed for turning the cake or the lid elevated, and the two sections of the pan can be easily disassociated for cleaning, &c.; and the invention consists in features of novelty hereinafter fully described, and pointed out in the claims.

Figure I is a perspective view of the waffle-iron seated on its supporting-rim. Fig. II is a side view of the same, the rim being in vertical section, and shows in broken lines the positions of the iron when elevated and turning and of the lid elevated. Fig. III is an enlarged transverse vertical section, taken on line III III, Fig. II, and shows the clamping device that holds the two sections of the handle together and through them those of the pan. Figs. IV and V are enlarged vertical sections taken on line IV V, Fig. VI, and show, relatively, the positions of the sectional universal ball-and-socket-movement joint when the iron is closed and when opened; and Fig. VI is an enlarged vertical section taken on line VI VI, Fig. IV, and shows the boxing that incloses the universal movement and the open lips between the sections of the ball that allow the elevation of the lid of the double pan or combined pan and cover while the lower section is in repose.

Referring to the drawings, in which similar figures of reference indicate like parts in all the views, 1 represents the elevating open rim, which sits around one of the openings in the top of the cook-stove seated within the circular opening in the rim. The waffle-iron is, as usual, made in two duplicate sections, 2, constituting a double pan or combined pan and cover, as far as said pan is concerned, and is provided with the usual projections on the inner faces of each section, so that, whichever side is for the time being uppermost, there is provided a pan proper and its cover, which alternately change places as the pan is revolved. The joint 3 between the duplicate sections is made tight, so as to prevent the escape of grease.

4 represents sectional trunnion-pins, the sections of which each relatively project from and are integral with the sides of the sections of the combined pan and cover, and which rest in recessed seats 5 in the rim. These pins being sectional, one half is integral with one moiety of the pan and the other with the other, so that they in combination support both moieties of the pan and brace against each other.

We now come to the most important features of the invention, which enable the turning of the pan and the cake it carries without depending on the pins 4 for a pivotal turn or the turning over of the handle from one side of the stove to the other.

6 represents a sectional universal ball-and-socket movement, the ball member of which is made in two sections, 7 and 8, that are relatively connected to and cast integral with the two sections of the combined pan and cover by the sectional neck 9.

Projecting inwardly and integral with the section 7 of the ball member of the universal joint is a ball-core, 10, the projecting portion of which ball-core works within the hollow section 8 of the ball-joint, and by this means the two sections of the ball member of the universal joint are kept in unison with each other to constitute together a perfect globe that works within the socket which is constituted by the concave bed 11 in the rim that supports the pan, and the concave cap 12, that surmounts said bed and is secured to its seat by screws 13. A curvilinear slot, 14, in said cap allows the elevation and turning within it of the sectional neck 9, that connects the sectional ball and combined pan and cover, and also allows of the elevation of the cover when the cake is to be removed or the pan replenished.

Each section 7 and 8 has a cut-away at the rear of their jointed connection, that, when the irons are closed, forms an open mouth, 15, whose lugs 16 then stand open in the rear of the ball-and-socket movement; but when the section of the double pan, which for the time being is the upper section or lid, is to be lifted the said open mouth in the socket of said ball-and-socket movement allows freedom for the lifting of said lid into the position shown in broken lines in Fig. II, at which time the lips press each other and close the mouth, as shown in Fig. V. As the open mouth and parted lips are of use in allowing the free working of the lid in opening, so also the closed mouth and lips provide a brace-hold, by which the lid is held from falling over when opened.

17 represents the duplicate socket-sections that hold the wood handles 20, which are keyed in said sockets by the screws 21. The socket-sections are each cast integral with its relative section of the pan, to which it is connected by the sectional shanks 18, and an overlap strap or lugs, 24, that project from one shank of the handle, embrace the other and hold the two sections of said handle and of the combined pan and cover in coincidence while the cake is being turned.

It will be seen that when the pan is at rest and the cake cooking it is supported on all four quarters by the neck of the ball-and-socket joint, the shank of the handle, and by the sectional trunnion-pins, so that it cannot when at rest tilt out of the level. When it is elevated to the position shown in broken lines in Fig. II, for turning the pan and its cake, the universal ball-and-socket movement 6 and the curvilinear slot 14 above it enable the cook to turn and reverse the same with great facility. The globular core that is cast integral with one section of the ball and is seated within the concavity of the other section preserves the relative coincident positions of the two sections while the pan is turning, and also when the lid is lifted for the removal of the waffle-cake and the deposit of fresh batter. The said core moves freely within said concavity of the corresponding section, and still keeps the sections of the ball in their co-relative position, so as to turn freely in their socket-seat.

When it is desired to remove the waffle-irons from the stove, the section of the pan that for the time being constitutes the cover is unclasped at the handle from the corresponding moiety of the pan and elevated as it is when the cake is to be removed or the pan replenished. After its elevation the said section is turned at a right angle to its corresponding section, so that its section of the ball in the socket is turned therein to present its narrow semi-globular diameter transversely of the curvilinear slot 14, in which position it is easily withdrawn through said slot. The other section is then elevated, turned in like manner, and also withdrawn in the same way. The use of this ready means of disconnecting the parts makes them much more convenient for cleaning. If, however, it should ever be desired to remove them from the stove without disassociation, the waffle-irons and rim can be removed together by the handle 22 or by a lifter when seated in the opening 23.

Long before the days of waffle-cakes it used to be considered quite an art with cooks to toss and thus turn pancakes with the long-handled frying-pans then in use, and it was considered that the cakes were lighter and better when thus skillfully turned by tossing than when turned with the knife or paddle, which frequently punctures, breaks, or bruises the cakes, and so allows the escape of the gaseous elements of fermentation necessary to the lightness of the product. So, also, with waffle-irons in which the handles have to make a semi-revolution over the pan, or in other ways, it is difficult to turn them without discomposing the cake, so that cakes of the same lightness and delicacy of construction cannot be prepared as by the use of the above-described universal sectional ball-and-socket movement. To effect the turn with the least possible movement, without a jar or shake of the pan, I have provided these waffle-irons that can be operated with a slight elevation of the handle and turn of the hand on the single universal bearing above described. When the two sections of the waffle-iron are brought together, the clutch-lug 24 makes a clasp-hold for the engagement, so that they do not too easily disconnect.

It will be seen that my peculiar conformation of the universal ball-joint, by which the waffle can be turned when the iron is raised to the position shown on the incline in broken lines in Fig. II, instead of, as usual, on the trunnion-pins 4, provides the means for turning over gasoline or other stoves on which the usual waffle-iron will not turn.

In conclusion, it will also be seen that by the use of my waffle-iron with its universal turning-joint, by which the usual trunnion-turn is avoided, the handles are not required to be turned over from side to side of the stove, to the great discomfiture of the cook and the saddening of the waffle.

I claim as my invention—

1. In a waffle-iron attachment, a ball-and-socket universal-bearing bed on which the pan is turned, substantially as and for the purpose set forth.

2. In a waffle-iron attachment, the combination of the sectional ball and sectional socket bed-plate forming the universal-movement bearing on which the pan is turned, substantially as and for the purpose set forth.

3. In a waffle-iron attachment, the combination of the sectional ball, the globular core 10, the concave bed-section of the socket bed-plate in which said ball works in a universal movement, and the concave cap of the socket-bed, substantially as and for the purpose set forth.

4. In a waffle-iron attachment, the combination of the sectional ball, the globular core 10, the concave bed-socket plate in which said ball is seated, and the concave cap that surmounts the ball provided with a curvilinear slot, 14, substantially as and for the purpose set forth.

5. In a waffle-iron attachment, the combination of the sectional ball, the globular core 10, the socket bed-plate in which said ball works, the concave cap-plate that surmounts said ball, provided with the curvilinear slot 14, the sectional combined pan and cover, and the sectional neck 9, the sections of which each relatively connect its section of the combined pan and cover with the corresponding section of the ball, substantially as and for the purpose set forth.

6. In a waffle-iron attachment, the combination of the sectional ball, the globular core 10, the socket bed-plate and cover within which said ball works, the sectional combined pan and cover, the sectional handle by which the waffle-iron is operated, and the projecting lugs 24, that couple the sections of the handle together, substantially as and for the purpose set forth.

EDWARD HOTCHKISS.

In presence of—
BENJN. A. KNIGHT,
SAML. KNIGHT.